Nov. 24, 1925.   J. M. CROMLEY   1,563,260
PIPE END TRIMMER
Filed July 12, 1924
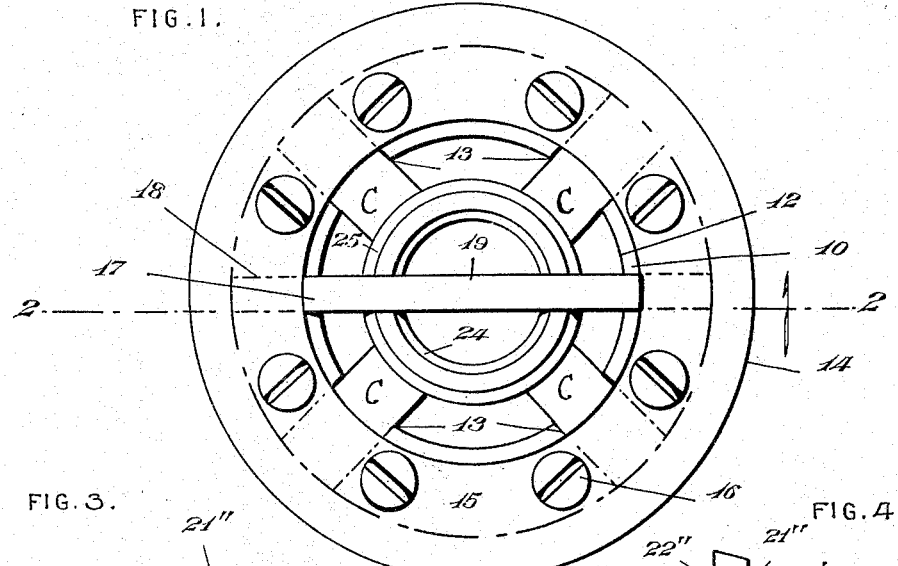
FIG.1.
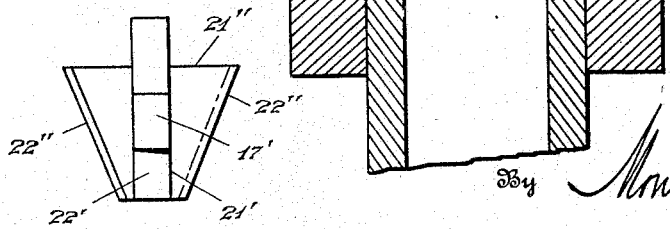
Inventor:
JOHN M. CROMLEY,
By
Attorney.

Patented Nov. 24, 1925.

1,563,260

UNITED STATES PATENT OFFICE.

JOHN M. CROMLEY, OF LEWISBURG, PENNSYLVANIA.

PIPE-END TRIMMER.

Application filed July 12, 1924. Serial No. 725,648.

*To all whom it may concern:*

Be it known that I, JOHN M. CROMLEY, a citizen of the United States, residing at Lewisburg, in the county of Union and State of Pennsylvania, have invented certain new and useful Improvements in Pipe-End Trimmers, of which the following is a specification, reference being had therein to the accompanying drawing.

The present invention relates to devices for trimming the ends of pipes, and aims to provide a novel and improved trimming cutter for attachment to the cutting or die head of a die stock, for conveniently trimming the end of a pipe, preferably when the screw thread is being cut thereon.

Another object of the invention is the provision of such a device having novel features of construction, to enhance the utility and efficiency thereof, and which device is simple in construction, economical to manufacture, and otherwise of advantage.

A further object is the provision of such a device which will simultaneously ream out and chamfer the end of the pipe, so as to form the pipe end with inner and outer bevels, the reaming out of the pipe end eliminating the burr which is usually formed in cutting the pipe, and the chamfer or outer bevel enabling the end of the pipe to be more readily inserted or started into a pipe fitting in which the pipe is screw-threaded.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a plan view showing the cutter as applied to a die head.

Fig. 2 is a diametrical section on the line 2—2 of Fig. 1.

Fig. 3 is a side elevation of a modified form of cutter.

Fig. 4 is a plan view of the cutter shown in Fig. 3.

Fig. 5 is an end view of said cutter.

As shown, the pipe end trimmer or cutter is applied to the die or cutting head of a die stock, and the device may be of different sizes for different sizes and styles of die heads. As shown, the die head 10 has a neck or shank 11 to be disposed in the body of the die stock, as well known, for rotating the head, and the head 10 has a recess 12 and radial slots 13 extending from said recess for receiving and holding the thread cutting dies C in the well known manner. A ring or collar 14 is fitted on the head around same, and at its outer edge has an inturned annular flange 15 overlapping the face of the head and extending across the slots 13 for holding the dies in said slots. Screws 16 extend through the flange 15 and are threaded into the head 10 for clamping the flange 15 against the head.

The pipe end trimming cutter is shown at 17, being formed from a flat bar or plate of metal, and said cutter extends diametrically across the recess 12 with its terminals fitted and seated in radial slots 18 with which the head 10 is provided to accommodate the cutter. The slots 18 are not so deep as the slots 13, thereby spacing the cutter from the bottom of the recess 12, and the cutter 17 has the outstanding portions 19 projecting upwardly through the opening defined by the flange 15. By removing the screws 16 and collar 14 from the head 10, the cutter 17 is readily placed in the slots 18, and then, by replacing the collar 14 and screw 16, the cutter 17 is securely held in place in the head 10.

The cutter 17 is formed at its inner edge with the V-shaped recesses 20 forming the reamer 21 therebetween, and the reamer 21 has the converging cutting edges 22. The opposite edges 23 formed by the recesses 20 diverge apart and provide chamfering cutting edges. The cutting edges 22 and 23 are bevelled to present sharp edges to the end of the pipe.

When the die head is fitted over the pipe, as seen in Fig. 2, the reamer 21 enters the end of the pipe, and by rotating the head with the cutter 17 bearing against the end of the pipe, the cutting edges 22 will ream out the end of the pipe, while the cutting edges 23 will chamfer the end of the pipe. This can be done while cutting the thread on the pipe. Thus, the end of the pipe is reamed out or formed with an inner bevel, as at 24, which eliminates the burr that is usually formed in cutting the pipe, and the end of the pipe is also formed with chamfer or outer bevel 25 which facilitates the insertion or starting of the end of the pipe into the pipe fixtures into which the pipe is screwed.

Figs. 3, 4 and 5 show a cutter or trimmer 17′ similar to the cutter 17, and having the notches or recesses 20′, the reamer 21′, and cutting edges 22′ and 23′ substantially the same as the cutter 17. The reamer 21′, however, is formed with a secondary companion reamer 21″ integral therewith and arranged at right angles thereto, and the reamer 21″ has the converging bevelled cutting edges 22″. This provides four cutting edges for the reamer portion of the cutter.

Having thus described the invention, what is claimed as new is:—

1. A pipe end trimmer comprising a cutter having terminal portions to be secured to a die head, and having a reamer portion between said terminal portions and a secondary reamer portion integral with the aforesaid reamer portion and arranged at right angles therewith, said reamer portions having converging cutting edges.

2. In combination, a die head having a recess and radial slots and a neck portion to receive a pipe with the end of the pipe projecting into said recess, a ring surrounding and secured to said head and having an inturned annular flange extending across said slots, and a cutter extending diametrically across said recess and having its terminal portions fitted in said slots and held therein by said flange, the cutter having cutting edges between said terminal portions for trimming the end of the pipe in said recess.

3. In combination, a die head having a recess and radial slots, a ring surrounding and secured to said head and having an inturned annular flange extending across said slots, and a cutter having terminal portions fitted in said slots and held therein by said flange, said cutter having an outstanding portion within the opening defined by said flange, and said cutter having cutting edges between said terminal portions for trimming the end of a pipe in said recess.

In testimony whereof I hereunto affix my signature.

JOHN M. CROMLEY.